(12) United States Patent
Joshi et al.

(10) Patent No.: US 10,102,276 B2
(45) Date of Patent: Oct. 16, 2018

(54) RESOLVING TEXTUAL NUMERICAL QUERIES USING NATURAL LANGUAGE PROCESSING TECHNIQUES

(71) Applicant: International Business Machines Corporation, Armonk, NY (US)

(72) Inventors: Sachindra Joshi, Bangalore (IN); Mukesh K. Mohania, Bangalore (IN); Joy Mustafi, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 14/961,151

(22) Filed: Dec. 7, 2015

(65) Prior Publication Data

US 2017/0161365 A1 Jun. 8, 2017

(51) Int. Cl.
G07F 17/30 (2006.01)
G06F 17/30 (2006.01)
G06F 17/27 (2006.01)

(52) U.S. Cl.
CPC ...... *G06F 17/30684* (2013.01); *G06F 17/271* (2013.01); *G06F 17/30427* (2013.01);
(Continued)

(58) Field of Classification Search
CPC ........... G06F 17/3066; G06F 17/30427; G06F 17/30637; G06F 17/30917; G06F 17/271
See application file for complete search history.

(56) References Cited

U.S. PATENT DOCUMENTS 8,527,865 B2 * 9/2013 Li ..................... G06F 17/30592
707/694
8,966,439 B2 2/2015 Wolfram
(Continued)

FOREIGN PATENT DOCUMENTS

WO 2013013173 A2 1/2013

OTHER PUBLICATIONS

Shatnawi et al.,"Equivalence Detection Using Parse-tree Normalization for Math Search",2007,IEEE,6 pages.*
(Continued)

*Primary Examiner* — Alexander Khong
(74) *Attorney, Agent, or Firm* — Ryan Mason & Lewis, LLP

(57) ABSTRACT

Methods, systems, and computer program products for resolving textual numerical queries using natural language processing techniques are provided herein. A computer-implemented method includes determining (i) each variable with a stated numerical value in a textual query and (ii) each variable without a stated numerical value in the query by performing semantic analysis on the query; normalizing each of the stated numerical values corresponding to one or more of the determined variables by automatically converting each of the stated numerical values corresponding to the determined variables to a pre-determined canonical form; mapping (i) all of the determined variables and (ii) the normalized values corresponding to the determined variables to a pre-defined dependency formulae graph; and generating a solution to the query by computing a numerical value for each of the determined variables without a stated numerical value by implementing a graphical model inference mechanism against the graph subsequent to said mapping.

16 Claims, 8 Drawing Sheets

(52) U.S. Cl.
CPC .... *G06F 17/30637* (2013.01); *G06F 17/3066* (2013.01); *G06F 17/30917* (2013.01)

(56) References Cited

U.S. PATENT DOCUMENTS

| | | |
|---|---|---|
| 2013/0304688 A1 | 11/2013 | Osogami et al. |
| 2014/0250045 A1 | 9/2014 | Bounouane et al. |
| 2015/0227589 A1* | 8/2015 | Chakrabarti ...... G06F 17/30525 707/748 |

OTHER PUBLICATIONS

Morton et al. A Novel Framework for Math Word Problem Solving, International Journal of Information and Education Technology; Feb. 1, 2013.

Wikipedia, Wolfram Alpha, https://en.wikipedia.org/wiki/Wolfram_Alpha, Dec. 4, 2015.

* cited by examiner

RESOLVING TEXTUAL NUMERICAL QUERIES USING NATURAL LANGUAGE PROCESSING TECHNIQUES

FIELD

The present application generally relates to information technology, and, more particularly, to natural language processing techniques.

BACKGROUND

Automatically resolving textual questions that are numerically-based presents multiple challenges. For example, existing approaches cannot detect variables nor automatically normalize relevant units. Accordingly, improved techniques are needed.

SUMMARY

In one embodiment of the present invention, techniques for resolving textual numerical queries using natural language processing techniques are provided. An exemplary computer-implemented method can include steps of determining (i) each of one or more variables with a stated numerical value in a textual query and (ii) each of one or more variables without a stated numerical value in the textual query by performing semantic analysis on the textual query. The method can also include normalizing each of the stated numerical values corresponding to one or more of the determined variables by automatically converting each of the stated numerical values corresponding to the one or more of the determined variables to a pre-determined canonical form, and mapping (i) all of the determined variables and (ii) the normalized values corresponding to the one or more of the determined variables to a pre-defined dependency formulae graph. Further, the method can include generating a solution to the textual query by automatically computing a numerical value for each of the one or more determined variables without a stated numerical value by implementing a graphical model inference mechanism against the pre-defined dependency formula graph subsequent to the mapping step.

In another embodiment of the invention, an exemplary computer-implemented method can include steps of generating a domain-specific dependency formulae graph for each of multiple domains based on a collection of pre-defined formulae, and determining (i) each of one or more variables with a stated numerical value in a textual query and (ii) each of one or more variables without a stated numerical value in the textual query by performing semantic analysis on the textual query. Additionally, such a method can also include selecting one of the multiple generated domain-specific dependency formulae graphs based on the determined variables in the textual query, and mapping (i) all of the determined variables and (ii) the stated values corresponding to one or more of the determined variables to the selected dependency formulae graph. Further, such a method can also include generating a solution to the textual query by automatically computing a numerical value for each of the one or more determined variables without a stated numerical value by implementing a graphical model inference mechanism against the selected pre-defined dependency formula graph subsequent to said mapping.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes analyzing a textual numerical question or query using natural language processing (NLP), and solving the textual numerical question using a sequence of one or more pre-defined formulae. Additionally, at least one embodiment of the invention can include tokening and performing semantic analysis on the textual numerical question for the detection of variables from the question. Further, as also detailed herein, one or more embodiments of the invention can include automatically normalizing units for each independent variable and mapping the variables to a dependency formula graph.

As additionally described herein, given a set of formulae in a particular domain, at least one embodiment of the invention includes creating a formulae dependency graph for the domain. Also, given a textual question, at least one embodiment of the invention can include observing a set of nodes in the graph as well as predicting a set of nodes. As detailed herein, at least one embodiment of the invention includes observing the real node in the graph, and predicting a particular node in the graph from the pattern of the nodes.

Additionally, as further detailed herein, such an embodiment includes identifying each of one or more independent variables in the textual question, determining value assignments for the identified independent variables, and discovering one or more dependent variables (that is, variables that are dependent upon one or more of the identified independent variables). As used herein, the unknown variable is the dependent variable, and to discover or compute such a variable, the independent variables are used as input.

One or more embodiments of the invention can also include normalizing the units of independent variables (as well as the units of dependent variables), wherein such units are converted to a single canonical form. Further, at least one embodiment of the invention includes implementing one or more graphical model inference mechanisms to determine the value of one or more dependent variables, given one or more observed variables. One or more embodiments of the invention additionally include inferring one or more independent variables from identified dependent variables using a pre-defined formulae graph.

Figure 1:
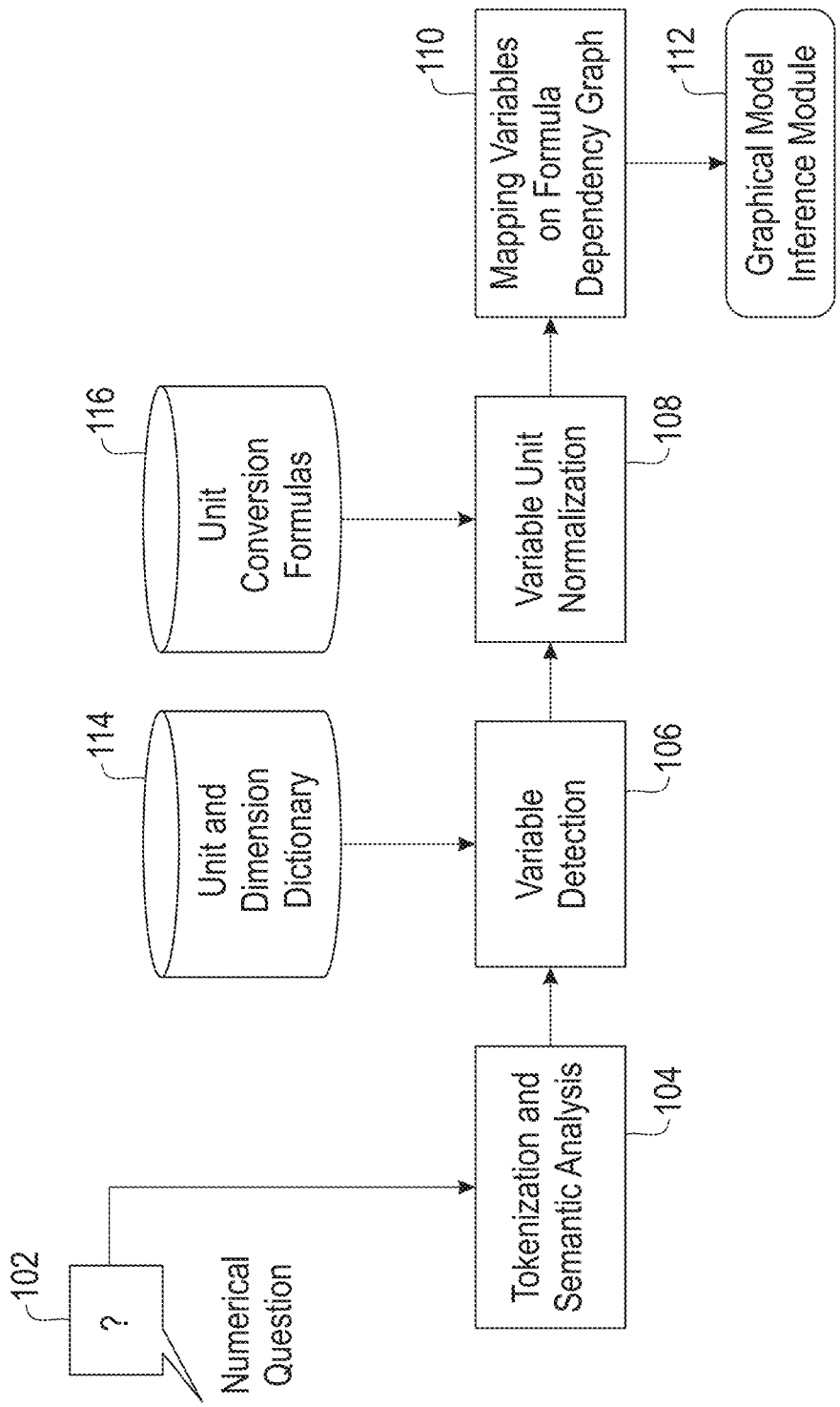
FIG. 1 is a diagram illustrating system architecture, according to an exemplary embodiment of the invention.

FIG. 1 is a diagram illustrating system architecture, according to an embodiment of the invention. By way of illustration, FIG. 1 depicts a textual numerical question 102, which is provided as input to a tokenization and semantic analysis component 104. As further detailed herein, the tokenization and semantic analysis component 104 generates an output that is provided to a variable detection component 106. Additionally, input from a unit and dimension dictionary database 114 provides input to the variable detection component 106 as well. Information that might be contained within the unit and dimension dictionary database 114 can include, for example, an identification that 1 kilometer=1000 meters. The variable detection component 106 generates an output identifying one or more variables in the numerical question 102 based on the noted inputs, and provides this output to a variable unit normalization component 108. Specifically, from the text, the variable detection component 106 identifies the semantically similar words which are close to the predefined formulae (for example, speed and velocity, falls and hits the ground, etc.).

As also depicted in FIG. 1, the variable unit normalization component 108 also receives input from a unit conversion formula database 116. Specific information that might be contained within the unit conversion formula database 116 can include, for example, an identification that 1 kilometer=0.621371 miles. The variable unit normalization component 108 generates an output that includes a normalized version of the one or more identified variables, wherein the variables have been converted to a single canonical form, based on the noted inputs, and provides this output to a formula dependency graph mapping component 110. The formula dependency graph mapping component 110 maps the normalized variables generated by component 108 onto a formula dependency graph (which can be generated via one or more embodiments of the invention, for example), and outputs the variable-mapped dependency graph to a graphical model inference module 112. As detailed herein, the graphical model inference module 112 determines one or more inferences to resolve the numerical question 102 based on analysis of the variable-mapped dependency graph. Additionally, the inference module 112 can resolve the numerical question by using natural language processing and graph structural details, as detailed herein.

As noted above, the tokenization and semantic analysis component 104 can include implementing semantic analysis of tokens derived from the numerical question 102. Such semantic analysis can include, for example, identifying functional mathematical terms and synonyms and/or analogs thereof in the numerical question 102. For instance, an addition function can be expressed in a textual numerical question via terms such as "add," "more (than)," "greater (than)," "bigger (than)," "increase," "hike," "accumulate," "acquire," "get," "take," etc. Also, a subtraction function can be expressed in a textual numerical question via terms such as "subtract," "minus," "lower (than)," "smaller," "less (than)," "decrease," "give," "eat," "consume," "put," "lose," etc. Additionally, for example, a multiplication function can be expressed in a textual numerical question via terms such as "multiple," "times," "double," "triple," "kilo," "mega," etc. Further, a division function can be expressed in a textual numerical question via terms such as "distribute," "equally divide," "partition," "half," "one-third," etc.

As also depicted in FIG. 1, the unit and dimension dictionary database 114 provides input to the variable detection component 106, wherein such inputs can include measurement categories such as, for example, height, width, length, distance, area, surface area, space, land, force speed, velocity, temperature, etc. As noted above, the variable detection component 106 can provide input to the variable unit normalization component 108, along with various conversion inputs derived from unit conversion formula database 116 such as, for example, 1 kilometer (km)=1000 meters, the temperature T in degrees Fahrenheit (° F.) is equal to the temperature T in degrees Celsius (° C.) multiple by (9/5) plus 32, etc.

Figure 2:
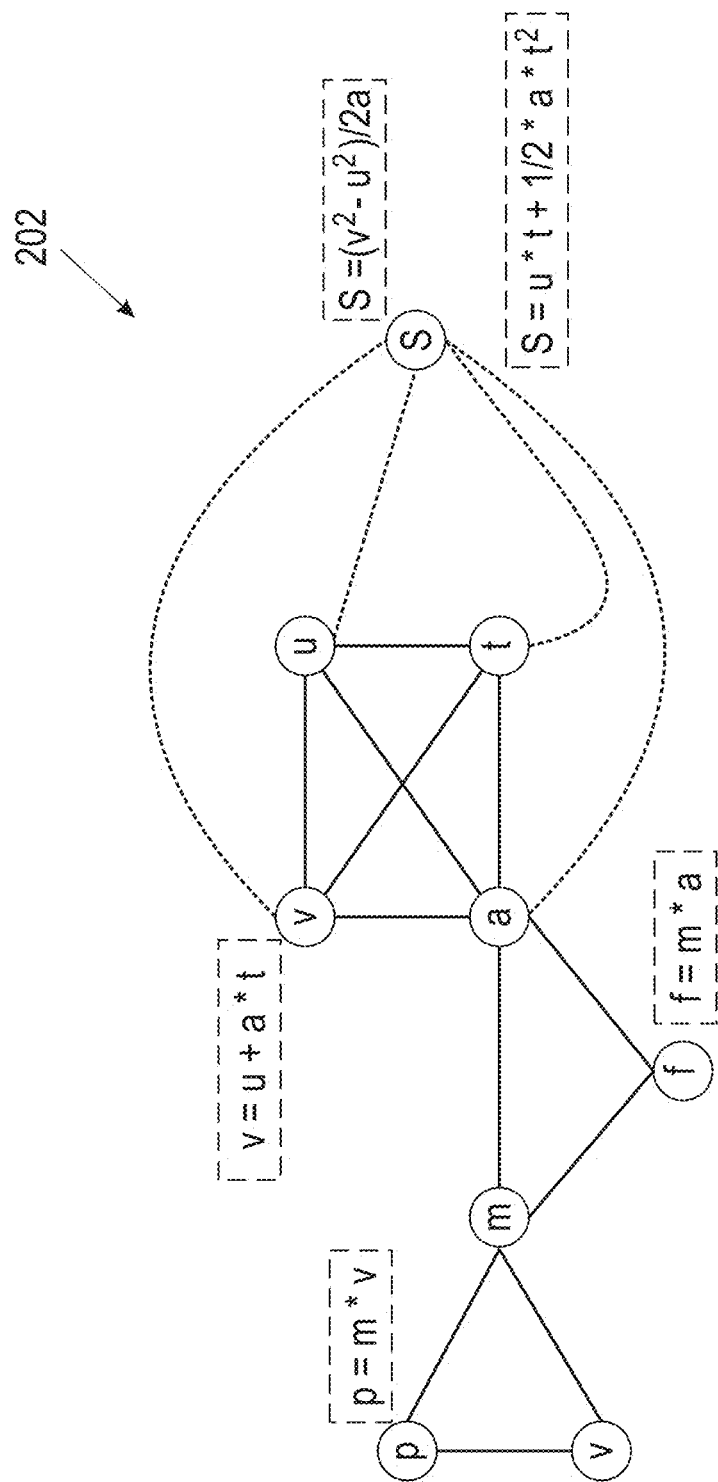
FIG. 2 is a diagram illustrating a formulae dependency graph, according to an exemplary embodiment of the invention.

FIG. 2 is a diagram illustrating a formulae dependency graph 202, according to an exemplary embodiment of the invention. As noted herein, given a set of formulae in a particular domain, at least one embodiment of the invention includes creating a formulae dependency graph for the domain. In the example embodiment of the invention depicted in FIG. 2, the given set of formulae includes displacement formulae ($S=(v^2-u^2)/2a$; as well as $S=u*t+\frac{1}{2}*a*t^2$), a force formula ($f=m*a$), a velocity formula ($v=u+a*t$), and a momentum formula ($p=m*v$). Also, as depicted in FIG. 2, the dashed/curved lines represent probable dependencies.

Additionally, as illustrated in graph 202, each formula be incorporated into a clique (that is, a subset of vertices of the graph) based on the variables (represented as vertices) of the given formula. As depicted in graph 202, variables v (final velocity), u (initial velocity), t (time) and a (acceleration) form a first clique, while variables a (acceleration), m (mass) and f (force) form a second clique, while variables m (mass), p (momentum) and v (final velocity) form a third clique.

Further, in connection with the formulae dependency graph 202 depicted in FIG. 2, consider the following example numerical question. Consider a ball that was hit from rest. The ball then travelled 10 meters in 2 seconds. Accordingly, the example question can include asking what is the value of the force with which the ball was hit was. In this example, at least one embodiment of the invention can analyze the numerical question to automatically determine that the phrase "was hit from rest" indicates that an initial velocity value (u)=0 meters per second, the phrase "travelled 10 meters" indicates that a displacement value (S)=10 meters, the phrase "2 seconds" indicates that a time value (t)=2 seconds, and the final question language indicates that we are looking to determine a force value. Accordingly, based on the arrangement and/or construction of the dependency graph 202, at least one embodiment of the invention can automatically infer the correct value for f (force) to resolve this numerical question.

Figure 3:
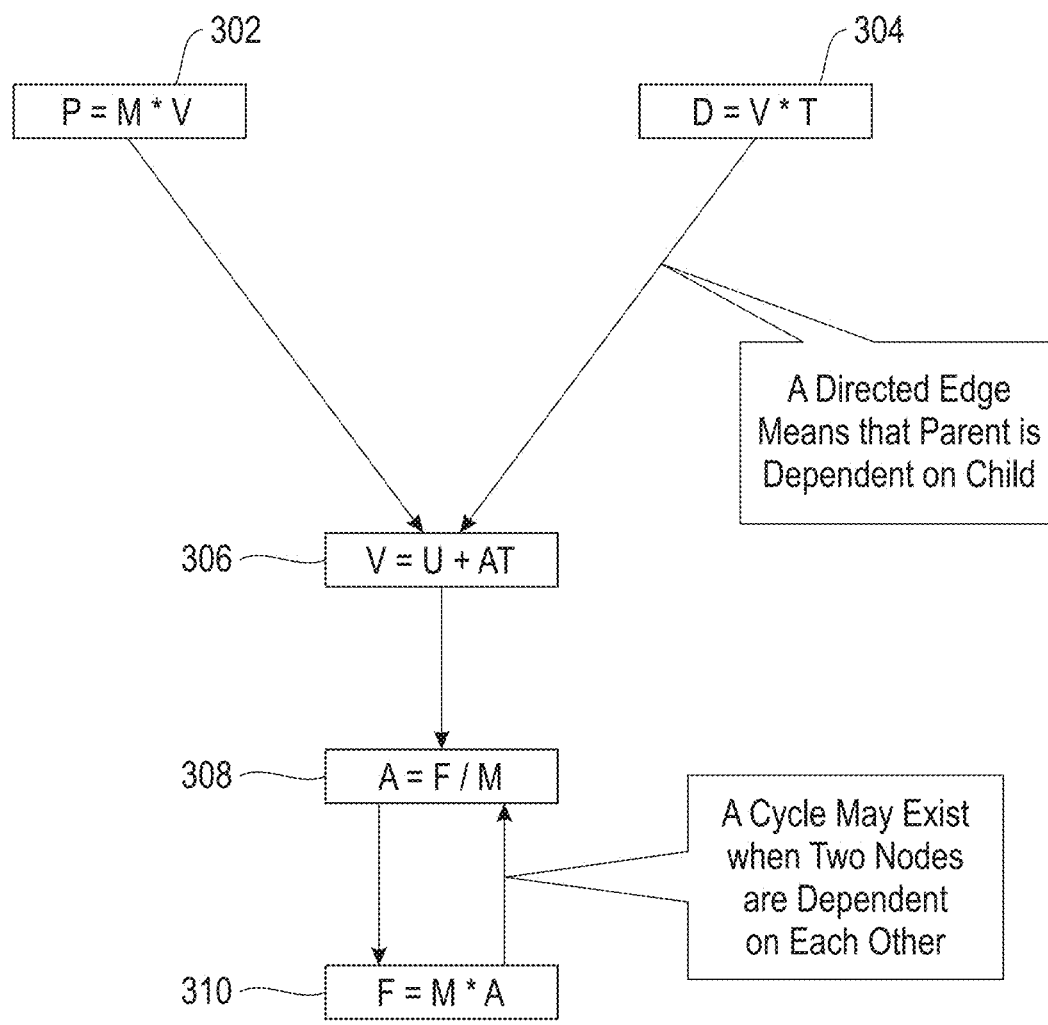
FIG. 3 is a diagram illustrating a network of parent and child nodes, according to an exemplary embodiment of the invention.

FIG. 3 is a diagram illustrating a network of parent and child nodes, according to an exemplary embodiment of the invention. Specifically, the parent and child nodes depicted in FIG. 3 represent various formulae. For instance, node 302 represents a momentum formula (p=m*v), node 304 represents a distance formula (d=v*t), node 306 represents a velocity formula (v=u+a*t), node 308 represents an acceleration formula (a=f/m), and node 310 represents a force formula (f=m*a). As also noted in FIG. 3, a directed edge between nodes (such as between node 304 and node 306, for example) indicates that the parent node (304) is dependent on the child node (306). Additionally, a cycle can exist between nodes (such as between node 308 and node 310, for example) when the two nodes are dependent on each other.

Figure 4A:
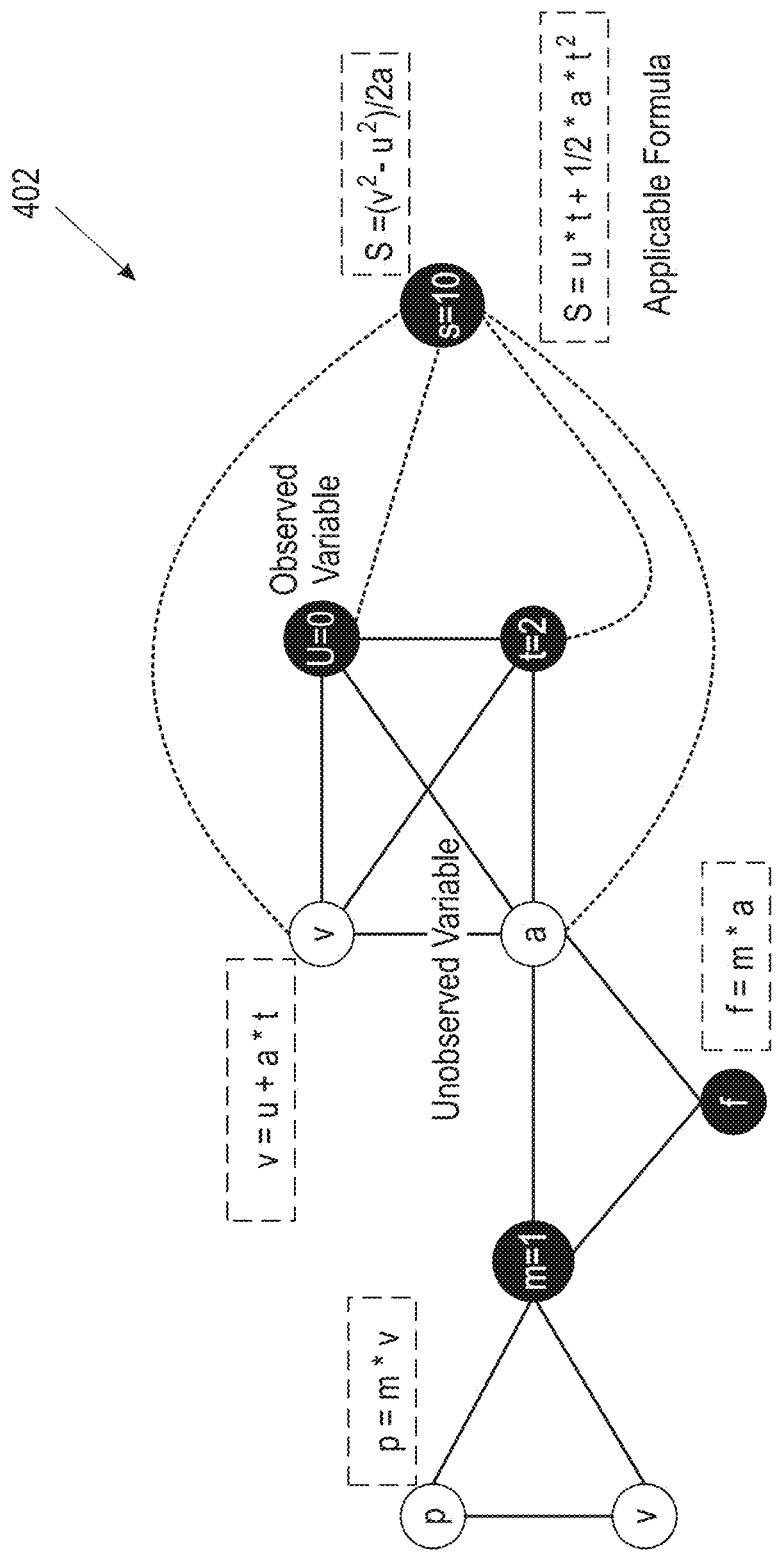
FIG. 4A is a diagram illustrating a formulae dependency graph, according to an exemplary embodiment of the invention.

FIG. 4A is a diagram illustrating a formulae dependency graph 402, according to an exemplary embodiment of the invention. As noted, formulae dependency graph 402 includes the same formulae (and corresponding cliques) as dependency graph 202, as detailed above in connection with FIG. 2. Formulae dependency graph 402, however, is illustrative of the following example numerical question. Consider a 1 kilogram (kg) ball that was hit from rest. The ball then travelled 10 meters in 2 seconds. Accordingly, what was the force with which the ball was hit?

In view of this example question, at least one embodiment of the invention can include automatically analyzing the question and determining the following. The phrase "1 kg" indicates that a mass value (m)=1 kg, while the phrase "was hit from rest" indicates that an initial velocity value (u)=0 meters per second. Also, the phrase "travelled 10 meters" indicates that a displacement value (s)=10 meters, the phrase "2 seconds" indicates that a time value (t)=2 seconds, and the question indicates that a force value (f) is being sought. Accordingly, FIG. 4A depicts these "observed variables" as indicated by shaded nodes s=10, u=0, t=2 and m=1 (while also shading node f as the variable being queried). Also, as illustrated in formulae dependency graph 402, as the m variable is an observed value and the f variable is being queried, the a (acceleration) variable that is needed to solve for variable f is identified as an "unobserved variable."

Figure 4B:
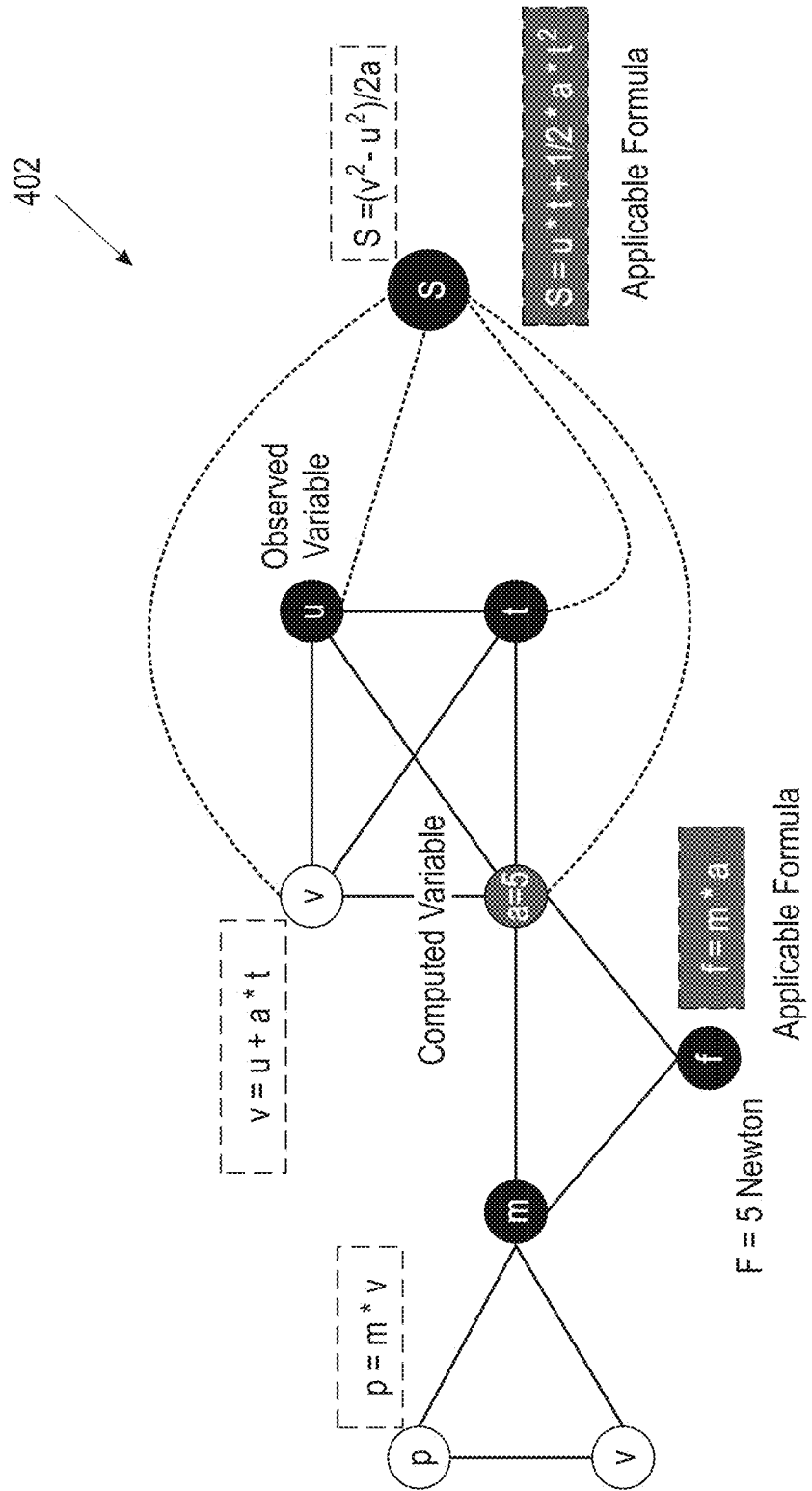
FIG. 4B is a diagram illustrating a formulae dependency graph, according to an exemplary embodiment of the invention.

Further, given the particular nodes that are observed, in conjunction with the configuration of the formulae dependency graph 402, at least one embodiment of the invention can also include identifying an applicable formula for solving for a targeted unobserved variable. In the FIG. 4A example, the applicable formula is identified as $S=u*t+\frac{1}{2}*a*t^2$. Accordingly, an example embodiment of the invention, such as depicted in FIG. 4B, can include solving the identified applicable formula for variable a, and subsequently using that determined value (5) for variable a to solve the force equation (f=m*a, therein identified as another applicable formula, as indicated in FIG. 4B) in conjunction with the observed m variable to determine the solution to the above-noted numerical question seeking a force value (5 Newton, as indicated in FIG. 4B).

Figure 5:
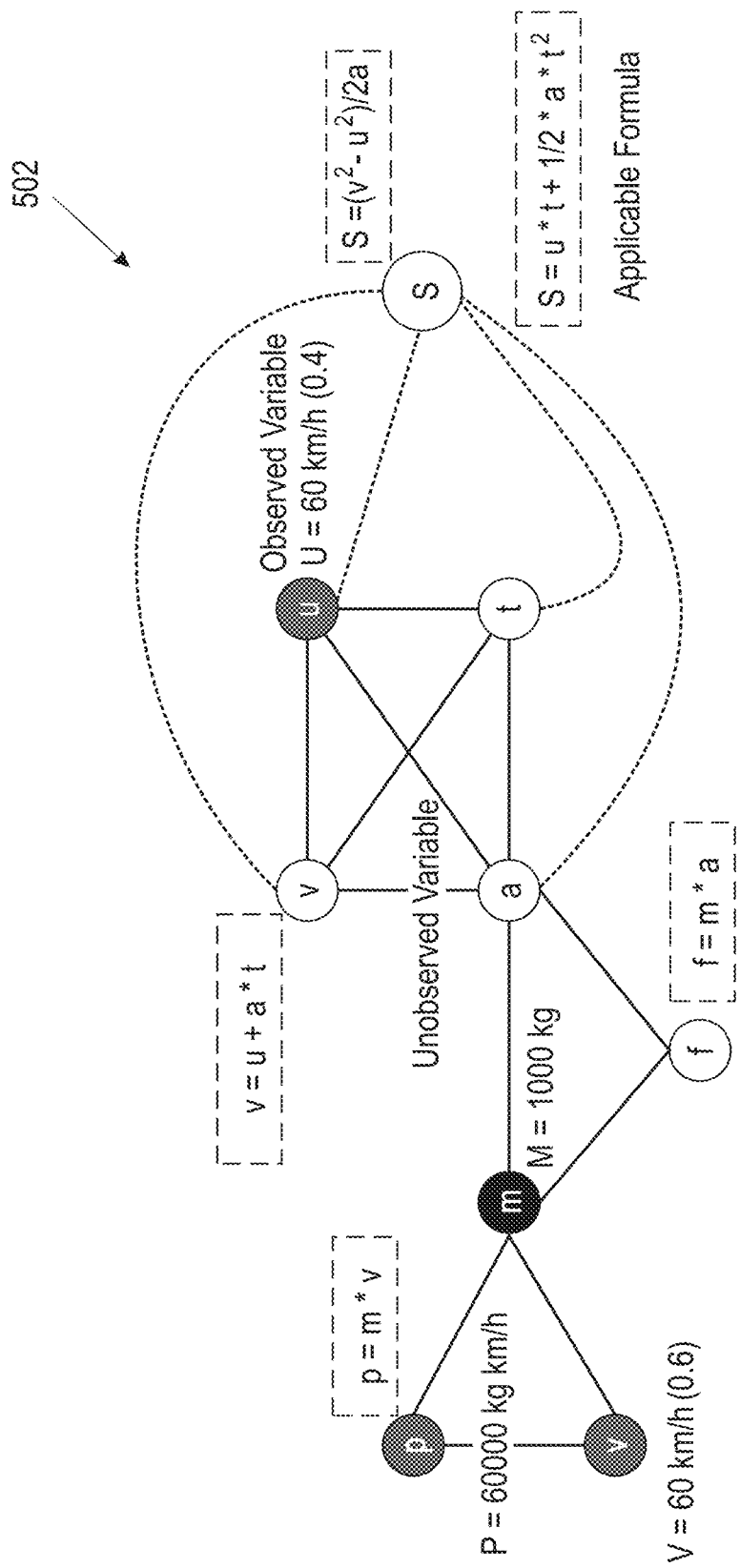
FIG. 5 is a diagram illustrating a formulae dependency graph, according to an exemplary embodiment of the invention.

FIG. 5 is a diagram illustrating a formulae dependency graph 502, according to an exemplary embodiment of the invention. As further described below, FIG. 5 depicts an example embodiment of the invention that includes implementing probabilistic detection techniques. In connection with the example embodiment of the invention depicted in FIG. 5, consider the following example numerical question. A car having a mass of 1000 kg is running at a speed of 60 km/hour. What is the momentum of the car? In this example question, the phrase "mass of 1000 kg" indicates that a mass (m) value=1000 kg, and the phrase "60 km/hour" indicates that a velocity (v) value=60 km/hr. As depicted in graph 502, at least one embodiment of the invention can include computing probability values for one or more variables. In the example embodiment depicted in FIG. 5, variable v is shown as having a probability value of 0.6, and variable u is shown as having a probability value of 0.4. Accordingly, in one or more embodiments of the invention, a probabilistic detection model can be used to determine the best possible variables or units from the historical problem base. Such a determination is a conditional probability for occurrence of one event, given another event has already occurred.

Figure 6:
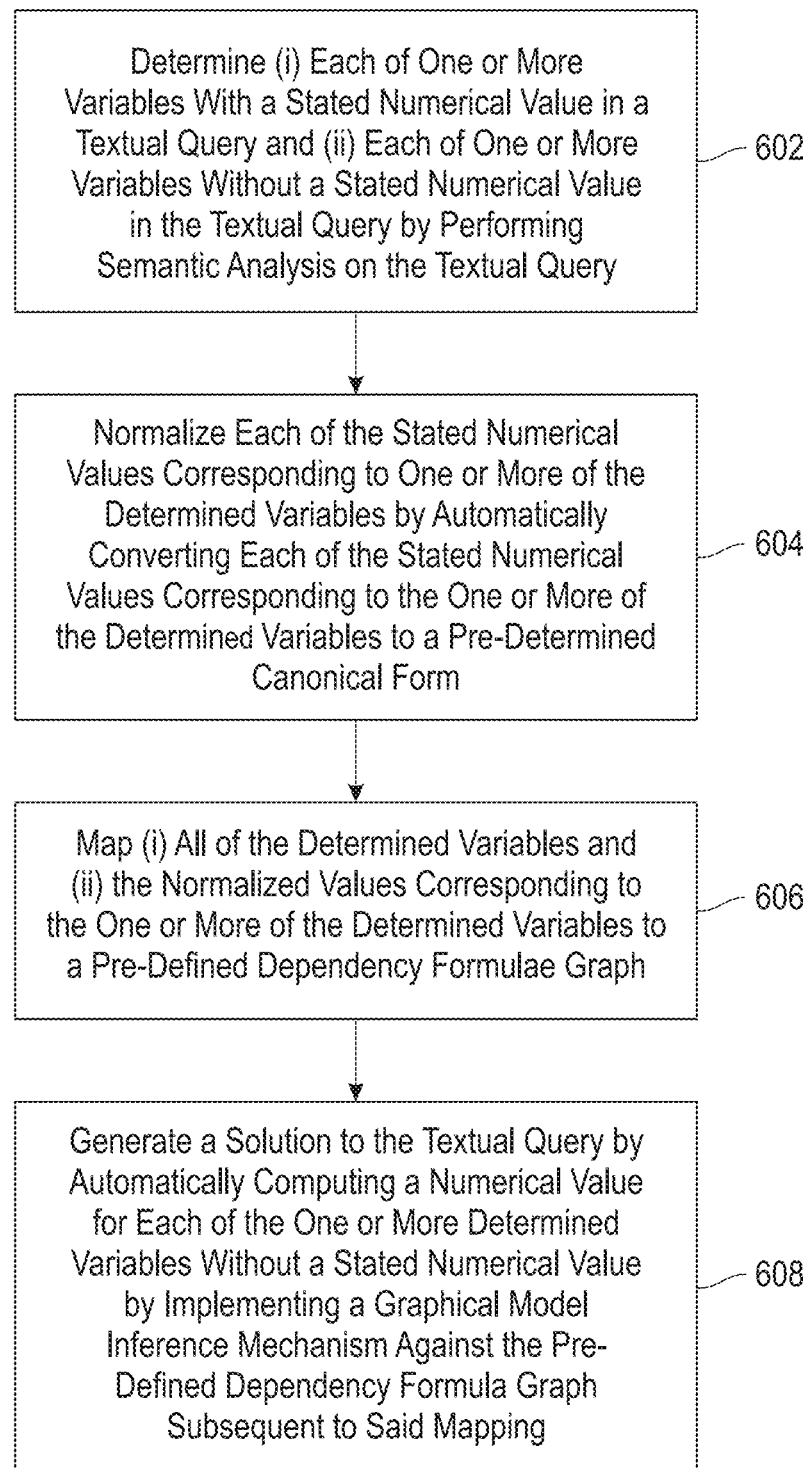
FIG. 6 is a flow diagram illustrating techniques according to an embodiment of the invention.

FIG. 6 is a flow diagram illustrating techniques according to an embodiment of the present invention. Step 602 includes determining (i) each of one or more variables with a stated numerical value in a textual query and (ii) each of one or more variables without a stated numerical value in the textual query by performing semantic analysis on the textual query. Performing semantic analysis can include automatically identifying one or more functional mathematical terms in the textual query, wherein the functional mathematical terms can include at least one of the terms selected from the group including (i) an addition term, (ii) a subtraction term, (iii) a multiplication term, and/or (iv) a division term. Performing semantic analysis can also include automatically identifying one or more synonyms of functional mathematical terms in the textual query.

Step 604 includes normalizing each of the stated numerical values corresponding to one or more of the determined variables by automatically converting each of the stated numerical values corresponding to the one or more of the determined variables to a pre-determined canonical form. Normalizing can include processing one or more value measurement categories associated with the stated numerical values, wherein the value measurement categories can include at least one element selected from the group including (i) height, (ii) width, (iii) length, (iv) distance, (v) area, (vi) surface area, (vii) velocity, and/or (viii) temperature. Normalizing can also include applying one or more unit conversion formulae to the stated numerical values.

Step 606 includes mapping (i) all of the determined variables and (ii) the normalized values corresponding to the one or more of the determined variables to a pre-defined dependency formulae graph. Step 608 includes generating a solution to the textual query by automatically computing a numerical value for each of the one or more determined variables without a stated numerical value by implementing a graphical model inference mechanism against the pre-defined dependency formula graph subsequent to said mapping. Implementing a graphical model inference mechanism can include inferring application of one or more distinct formulae among the pre-defined dependency formulae graph related to computing a numerical value for each of the one or more determined variables without a stated numerical value.

Also, an additional embodiment of the invention includes generating a domain-specific dependency formulae graph for each of multiple domains based on a collection of pre-defined formulae, and determining (i) each of one or more variables with a stated numerical value in a textual query and (ii) each of one or more variables without a stated numerical value in the textual query by performing semantic analysis on the textual query. Additionally, such an embodiment can also include selecting one of the multiple generated domain-specific dependency formulae graphs based on the determined variables in the textual query, and mapping (i) all of the determined variables and (ii) the stated values corresponding to one or more of the determined variables to the selected dependency formulae graph. Such graph selection can be carried out, for example, by searching and matching the closest graph data structure of the pre-defined formulae. Further, such an embodiment can also include generating a solution to the textual query by automatically computing a numerical value for each of the one or more determined variables without a stated numerical value by implementing a graphical model inference mechanism against the selected pre-defined dependency formula graph subsequent to said mapping.

Such an embodiment of the invention can also further include grouping multiple subsets of vertices into a clique for each of the generated dependency formulae graphs, wherein said grouping is based on the variables of the corresponding formulae, and wherein the vertices represent the variables.

At least one embodiment of the invention (such as the techniques depicted in FIG. 6, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives textual query information sent from a data source to the transmission server. The server can process the information, for example, based upon user-provided user preference information that is stored in memory on the server. Subsequently, an alert is generated containing the textual query information. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 7:
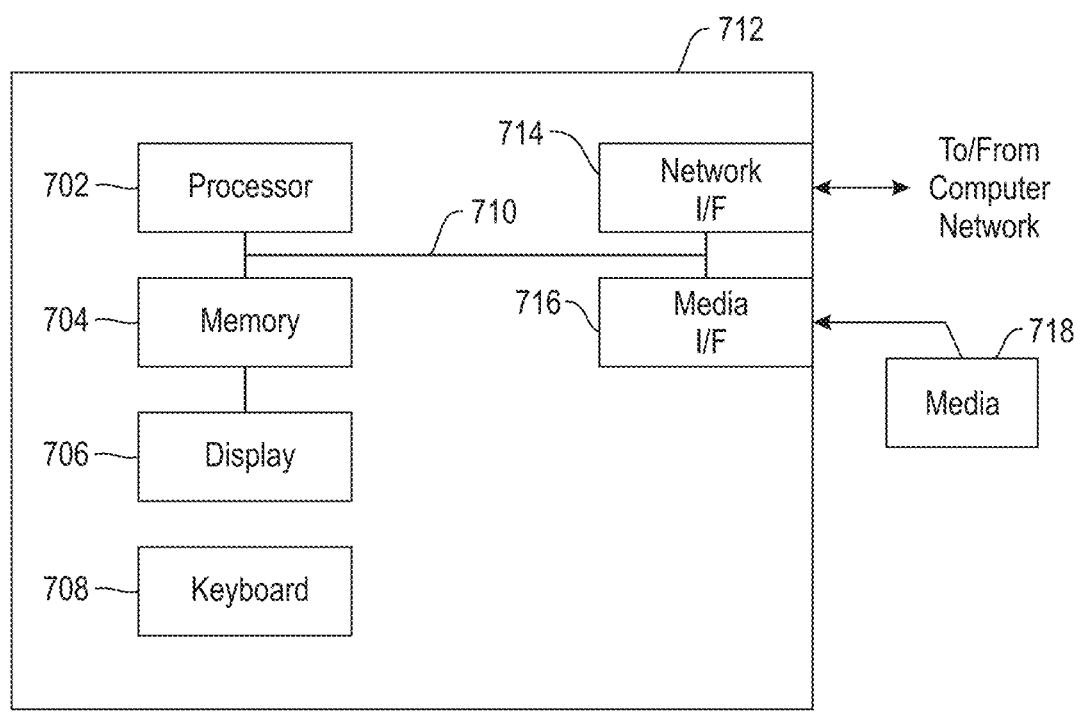
FIG. 7 is a system diagram of an exemplary computer system on which at least one embodiment of the invention can be implemented.

Additionally, an embodiment of the present invention can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, normalizing units for each of one or more independent variables for mapping such variables to a dependency formula graph.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining (i) each of one or more variables with a stated numerical value in a textual query and (ii) each of one or more variables without a stated numerical value in the textual query by performing semantic analysis on the textual query;
   normalizing each of the stated numerical values corresponding to one or more of the determined variables by automatically converting each of the stated numerical values corresponding to the one or more of the determined variables to a pre-determined canonical form, wherein said normalizing comprises processing one or more value measurement categories (i) associated with the stated numerical values and (ii) represented by natural language in the textual query;
   mapping (i) all of the determined variables and (ii) the normalized values corresponding to the one or more of the determined variables to a pre-defined dependency formulae graph; and
   generating a solution to the textual query by automatically computing a numerical value for each of the one or more determined variables without a stated numerical value by implementing a graphical model inference mechanism against the pre-defined dependency formula graph subsequent to said mapping, wherein said implementing the graphical model inference mechanism comprises inferring application of one or more distinct formulae among the pre-defined dependency formulae graph related to computing a numerical value for each of the one or more determined variables without a stated numerical value;
   wherein the steps are carried out by at least one computing device.

2. The computer-implemented method of claim 1, wherein said performing semantic analysis comprises automatically identifying one or more functional mathematical terms in the textual query.

3. The computer-implemented method of claim 2, wherein said one or more functional mathematical terms comprise at least one of the terms selected from the group consisting of (i) an addition term, (ii) a subtraction term, (iii) a multiplication term, and (iv) a division term.

4. The computer-implemented method of claim 1, wherein said performing semantic analysis comprises automatically identifying one or more synonyms of functional mathematical terms in the textual query.

5. The computer-implemented method of claim 1, wherein said one or more value measurement categories comprise at least one element selected from the group consisting of (i) height, (ii) width, (iii) length, (iv) distance, (v) area, (vi) surface area, (vii) velocity, and (viii) temperature.

6. The computer-implemented method of claim 1, wherein said normalizing comprises applying one or more unit conversion formulae to the stated numerical values.

7. A computer program product, the computer program product comprising a computer readable storage medium having program instructions embodied therewith, the program instructions executable by a device to cause the device to:
   determine (i) each of one or more variables with a stated numerical value in a textual query and (ii) each of one or more variables without a stated numerical value in the textual query by performing semantic analysis on the textual query;
   normalize each of the stated numerical values corresponding to one or more of the determined variables by automatically converting each of the stated numerical values corresponding to the one or more of the determined variables to a pre-determined canonical form, wherein said normalizing comprises processing one or more value measurement categories (i) associated with the stated numerical values and (ii) represented by natural language in the textual query;
   map (i) all of the determined variables and (ii) the normalized values corresponding to the one or more of the determined variables to a pre-defined dependency formulae graph; and
   generate a solution to the textual query by automatically computing a numerical value for each of the one or more determined variables without a stated numerical value by implementing a graphical model inference mechanism against the pre-defined dependency formula graph subsequent to said mapping, wherein said implementing the graphical model inference mechanism comprises inferring application of one or more distinct formulae among the pre-defined dependency formulae graph related to computing a numerical value for each of the one or more determined variables without a stated numerical value.

8. The computer program product of claim 7, wherein said performing semantic analysis comprises automatically identifying one or more functional mathematical terms in the textual query.

9. The computer program product of claim 7, wherein said performing semantic analysis comprises automatically identifying one or more synonyms of functional mathematical terms in the textual query.

10. The computer program product of claim 7, wherein said normalizing comprises applying one or more unit conversion formulae to the stated numerical values.

11. A system comprising:
a memory; and
at least one processor coupled to the memory and configured for:
determining (i) each of one or more variables with a stated numerical value in a textual query and (ii) each of one or more variables without a stated numerical value in the textual query by performing semantic analysis on the textual query;
normalizing each of the stated numerical values corresponding to one or more of the determined variables by automatically converting each of the stated numerical values corresponding to the one or more of the determined variables to a pre-determined canonical form, wherein said normalizing comprises processing one or more value measurement categories (i) associated with the stated numerical values and (ii) represented by natural language in the textual query;
mapping (i) all of the determined variables and (ii) the normalized values corresponding to the one or more of the determined variables to a pre-defined dependency formulae graph; and
generating a solution to the textual query by automatically computing a numerical value for each of the one or more determined variables without a stated numerical value by implementing a graphical model inference mechanism against the pre-defined dependency formula graph subsequent to said mapping, wherein said implementing the graphical model inference mechanism comprises inferring application of one or more distinct formulae among the pre-defined dependency formulae graph related to computing a numerical value for each of the one or more determined variables without a stated numerical value.

12. A computer-implemented method, comprising:
generating a domain-specific dependency formulae graph for each of multiple domains based on a collection of pre-defined formulae;
determining (i) each of one or more variables with a stated numerical value in a textual query and (ii) each of one or more variables without a stated numerical value in the textual query by performing semantic analysis on the textual query;
normalizing each of the stated numerical values corresponding to one or more of the determined variables by automatically converting each of the stated numerical values corresponding to the one or more of the determined variables to a pre-determined canonical form, wherein said normalizing comprises processing one or more value measurement categories (i) associated with the stated numerical values and (ii) represented by natural language in the textual query;
selecting one of the multiple generated domain-specific dependency formulae graphs based on the determined variables in the textual query;
mapping (i) all of the determined variables and (ii) the normalized values corresponding to one or more of the determined variables to the selected dependency formulae graph; and
generating a solution to the textual query by automatically computing a numerical value for each of the one or more determined variables without a stated numerical value by implementing a graphical model inference mechanism against the selected pre-defined dependency formula graph subsequent to said mapping, wherein said implementing the graphical model inference mechanism comprises inferring application of one or more distinct formulae among the pre-defined dependency formulae graph related to computing a numerical value for each of the one or more determined variables without a stated numerical value;
wherein the steps are carried out by at least one computing device.

13. The computer-implemented method of claim 12, comprising:
grouping multiple subsets of vertices into a clique for each of the generated dependency formulae graphs, wherein said grouping is based on the variables of the corresponding formulae, and wherein the vertices represent the variables.

14. The computer-implemented method of claim 12, wherein said performing semantic analysis comprises automatically identifying one or more functional mathematical terms in the textual query.

15. The computer-implemented method of claim 14, wherein said one or more functional mathematical terms comprise at least one of the terms selected from the group consisting of (i) an addition term, (ii) a subtraction term, (iii) a multiplication term, and (iv) a division term.

16. The computer-implemented method of claim 12, wherein said performing semantic analysis comprises automatically identifying one or more synonyms of functional mathematical terms in the textual query.

\* \* \* \* \*